(12) United States Patent
Breuer et al.

(10) Patent No.: US 11,770,824 B2
(45) Date of Patent: Sep. 26, 2023

(54) CONFIGURATION OF DEDICATED UPLINK RESOURCE TRANSMISSION SCHEDULE

(71) Applicant: Telit Cinterion Deutschland GmbH, Munich (DE)

(72) Inventors: Volker Breuer, Botzow (DE); Osaid Khaliq, Berlin (DE)

(73) Assignee: Telit Cinterion Deutschland GmbH, Munich (DE)

( * ) Notice: Subject to any disclaimer, the term of this patent is extended or adjusted under 35 U.S.C. 154(b) by 3 days.

(21) Appl. No.: 17/441,739

(22) PCT Filed: Mar. 24, 2020

(86) PCT No.: PCT/EP2020/058178
§ 371 (c)(1),
(2) Date: Sep. 22, 2021

(87) PCT Pub. No.: WO2020/193557
PCT Pub. Date: Oct. 1, 2020

(65) Prior Publication Data
US 2022/0191901 A1   Jun. 16, 2022

(30) Foreign Application Priority Data

Mar. 26, 2019  (EP) .................................. 19165108

(51) Int. Cl.
*H04W 28/26* (2009.01)
*H04W 72/12* (2023.01)
(Continued)

(52) U.S. Cl.
CPC ....... *H04W 72/1268* (2013.01); *H04W 28/26* (2013.01); *H04W 72/535* (2023.01)

(58) Field of Classification Search
None
See application file for complete search history.

(56) References Cited

U.S. PATENT DOCUMENTS

| | | | | |
|---|---|---|---|---|
| 2010/0034158 | A1* | 2/2010 | Meylan | H04L 1/1854 370/252 |
| 2014/0018085 | A1* | 1/2014 | Young | H04W 76/27 455/450 |

(Continued)

FOREIGN PATENT DOCUMENTS

| | | |
|---|---|---|
| EP | 3285535 A1 | 2/2018 |
| JP | 2012500525 A | 1/2012 |
| WO | 2017015528 A1 | 1/2017 |

OTHER PUBLICATIONS

Examination Report from JP Patent Office for co-pending patent Application N° JP2021-548631 and English translation (5 pages).
(Continued)

*Primary Examiner* — Kenny S Lin
(74) *Attorney, Agent, or Firm* — PEARL COHEN ZEDEK LATZER BARATZ LLP

(57) ABSTRACT

Herein provided is a method for operating a base station of a cellular network. The base station serves user equipment camping thereon, or connected thereto, and agrees with the user equipment to a periodic dedicated prescheduled uplink transmission schedule. Upon determining that an uplink occasion of that schedule is missed by the user equipment, the user equipment is considered as unavailable for communicating at said uplink occasion in relation with the base station. If it is considered unavailable, it instead maintains a presently active dedicated prescheduled uplink transmission schedule. Otherwise it cancels the presently active dedicated prescheduled uplink transmission schedule. Other embodiments are disclosed.

14 Claims, 4 Drawing Sheets

(51) Int. Cl.
*H04W 72/1268* (2023.01)
*H04W 72/50* (2023.01)

(56) References Cited

U.S. PATENT DOCUMENTS

| | | | |
|---|---|---|---|
| 2017/0289968 A1* | 10/2017 | Marco | H04W 72/23 |
| 2018/0139734 A1* | 5/2018 | Babaei | H04W 72/23 |
| 2019/0116490 A1* | 4/2019 | Chang | H04W 88/023 |
| 2019/0230706 A1* | 7/2019 | Li | H04W 72/12 |

OTHER PUBLICATIONS

International Search Report (PCT/ISA/210) and Written Opinion (PCT/ISA/237) dated May 26, 2020, by the European Patent Office as the International Searching Authority for International Application No. PCT/EP2020/058178 (WO2020/193557—[10 pages].
Nokia et al: "Signaling Aspects for D-PUR", 3GPP Draft; R2-1900321-D-PUR-V2, 3rd Generation Partnership Project (3GPP), Mobile Competence Centre ; 650, Route Des Lucioles ; F-06921 Sophia-Antipolis Cedex; France vol. RAN WG2, No. Athens, Greece; Feb. 25, 2019-Mar. 1, 2019 Feb. 15, 2019 (Feb. 15, 2019), XP051601718.
Sierra Wireless: "Email discussion [104#43][eMTC & NB-IoT R16] D-PUR report", 3GPP Draft; R2-1900120, 3rd Generation Partnership Project (3GPP), Mobile Competence Centre; 650, Route Des Lucioles ; F-06921 Sophia-Antipolis Cedex; France.

* cited by examiner

CONFIGURATION OF DEDICATED UPLINK RESOURCE TRANSMISSION SCHEDULE

CROSS-REFERENCE TO RELATED APPLICATIONS

This application is a National Phase Application of PCT International Application No. PCT/EP2020/058178, International Filing Date Mar. 24, 2020, claiming the benefit of European Patent Application No. 19165108.2, filed Mar. 26, 2019, which are hereby incorporated by reference.

BACKGROUND

Field

The present invention concerns telecommunication systems. In particular, it relates to power management, scheduling, and data transmission among components of a cellular mobile communication system.

Introduction

In the field of cellular wireless communication the cellular network tends to support a wide variety of user equipment. In particular in the field of machine-type devices, also covered by the term Internet of things, a couple of modifications are used to streamline the operation between cellular network and user equipment for special needs of the machine-type device.

In particular, machine-type communication (MTC) devices are configured to carry out regular transmission like daily measurements, status updates, requests for updates etc. In the wireless technology standards adaptations are developed, e.g. as discussed in EP3032903A1, how to better prepare the cellular networks for such kinds of periodic data transmissions. This approach is treated in the current cellular technology standard under the term D-PUR=dedicated pre-configured uplink resources. Generally this concept is called hereinafter dedicated prescheduled uplink transmission schedules.

With this concept the machine-type user equipment negotiates with the base station and the cellular network for regular periodic scheduling, e.g. once a day/once per hour at a specific time. That means, the user equipment does not need to ask for resource on that specific occasion, but is expected to carry out at least one uplink transmission, while the base station is prepared for this transmission and has reserved resources for that user equipment, but without or at least minimized additional signalling in preparation of each data transmission.

This is advantageous for both the user equipment, as it saves power consumption, and the cellular network, as it reduces the congestion and is plannable. It is in particular advantageous as in many cases the user equipment only submits very low amounts of payload. The necessary signalling without D-PUR for setting up a connection and requesting resources for such a low data transmission often outnumbers the amount of payload.

SUMMARY

A problem with the currently defined systems is that when the user equipment misses one or a few uplink transmission occasions, the base station cancels the agreed D-PUR session, yet prior to the next data transmission, a new D-PUR session needs to be negotiated. In such an approach, the user equipment might be out of order or deactivated or moved to another cell. Hence the base station would reserve resources for such user equipment that is not used.

One disadvantage of this approach is when the user equipment has missed the uplink transmission occasion. In such a case, the amount of signalling for setting up the D-PUR session further congests the cellular network, which might overcompensate the savings otherwise to be achieved with this approach. Further in an already congested cellular network, the user equipment might lose its resource reservation; and, in extreme cases, it would not be served anymore for some time.

As MTC user equipments are often equipped with limited transmitter/receiver circuitry, this problematic situation might happen more frequently than for other devices. This is in particular due to being operating in half duplex (for FDD), and that means during a download session there is no practical way to carry out an uplink transmission at the uplink transmission occasion. Other limitations when the user equipment might miss the uplink transmission occasion are further encompassed. The situation may also arise if the application attached to the user equipment started an additional uplink (UL) communication which may be allocated on a different frequency, and hence cannot fulfill, or does momentary not need, the pre-scheduled transmission occasion. The same situation occurs when the user equipment needs to send signaling acknowledgment in UL or listen in downlink (DL) direction.

Therefore, a solution is required to improve dedicated prescheduled uplink transmission scheduling approaches like D-PUR, in order to reduce the situations where a running session of dedicated prescheduled uplink transmission schedules is cancelled due to the user equipment missing an uplink transmission occasion.

Accordingly, herein provided is a solution for an improved handling of dedicated prescheduled uplink transmission schedules.

In a first embodiment, a method is provided for operating a base station capable of supporting dedicated uplink resource transmission schedule for a user equipment operating in a cellular network. In a second embodiment, a base station of a cellular network is provided incorporating said method. In a third embodiment, a method is provided for operating a user equipment operating with said base station. In a fourth embodiment, a user equipment operates using said method for user equipment.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

DETAILED DESCRIPTION

Figure 1:
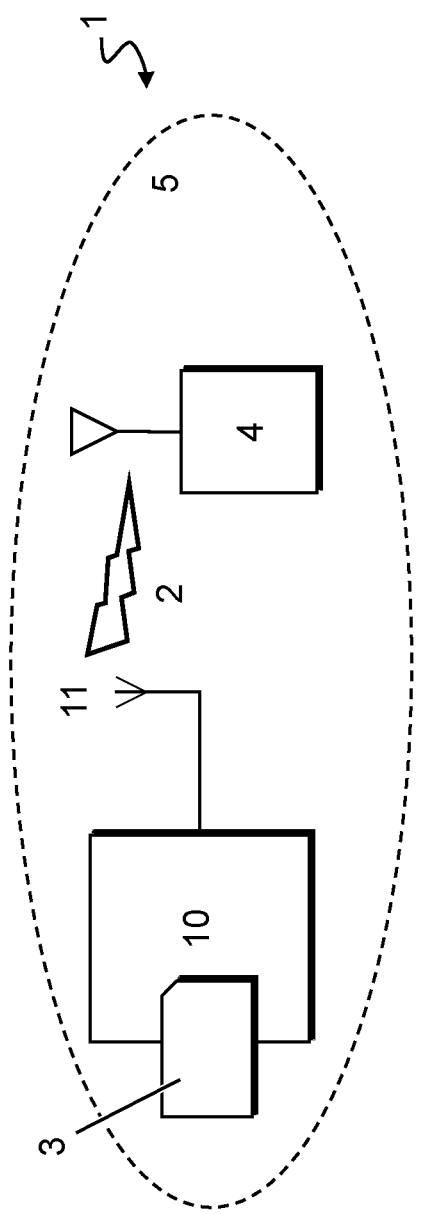
FIG. 1 schematically illustrates a user equipment in conjunction with a base station of the type in accordance with one embodiment.

While the specification concludes with claims defining the features of the invention that are regarded as novel, it is believed that the invention will be better understood from a consideration of the following description in conjunction with the drawing figures, in which like reference numerals are carried forward.

A list of acronyms referenced herein is provided:
Acronyms:
DL—Down Link
MTO—Machine Type Communication
RPM—Radio Policy Management
SCPTM—Single Cell Point To Multipoint
UL—Up Link According to a first embodiment, a method for operating a base station of a cellular network for serving (at least one) user equipment camping on said base station, said base station having agreed with the user equipment on a periodic dedicated prescheduled uplink transmission schedule, in case one or more uplink occasion of the dedicated prescheduled uplink transmission schedule is missed by the user equipment, the method comprising for the base station the step of determining if the user equipment is considered as unavailable for communicating at said uplink occasion in relation with the base station, and, if so, maintaining presently active dedicated prescheduled uplink transmission schedule, otherwise, cancelling the presently active dedicated prescheduled uplink transmission schedule. A second embodiment relates to the base station of the cellular network. Briefly, the base station can be configured to implement the method exemplified in the first embodiment. In particular the base station implements one of the cellular technology standards 3G, 4G, 5G or beyond. The base station is one of the plurality of base stations of the cellular network. The base station is configured to serve the (at least one) user equipment, which is regularly transmitting a similar amount of data to a remote server and is moreover operated stationary. "Stationary" means at least not or merely not moving for a certain time period in which several regular transmissions should be carried out. An example for such a user equipment is a metering device which periodically transmits its measurements at a defined time, or at least in a defined corridor of time. This periodicity is preferably in the range from seconds up to days, depending upon the purpose of the user equipment.

For limiting the signalling load for such a type of regular data transmission, a periodic dedicated prescheduled uplink transmission schedule is arranged between base station and user equipment. The dedicated prescheduled uplink transmission schedule is a mode of operating between the user equipment and the base station which allows transmitting data in a predefined periodicity and data amount. No, or at least limited additional, signalling is necessary per each uplink occasion; that is, the period where, according to the dedicated prescheduled uplink transmission schedule, the base station allocates resources sufficient for the expected data transmissions from the user equipment.

For setting up the dedicated prescheduled uplink transmission schedule, the user equipment preferably transmits a request to the base station indicative of the envisaged data transmission. That request comprising a particular amount of data and a planned periodicity. Moreover this request may also contain the duration for which the dedicated prescheduled uplink transmission schedule is envisaged, which my last from hours to an indefinite period (infinity), the latter one especially beneficial for meter(ed) applications. The base station in response, evaluates the request according to the requested periodicity, duration and/or on the requested data amount, and respective resources for uplink transmission according to a schedule with the approved periodicity. This information is provided in response to the user equipment with a confirmation message.

The user equipment can then decide to accept the schedule or reject it and continue to operate without the dedicated prescheduled uplink transmission schedule. Preferably it may ask later, at least for a limited amount of times during a given period, for setting up the dedicate prescheduled uplink transmission schedule again, which then better fits to the requirements of the user equipment.

Preferably, the base station indicates, by means of SIBs it supports, the dedicated prescheduled uplink transmission schedule. When this dedicated prescheduled uplink transmission schedule is set up, the base station expects the user equipment to carry out a data transmission on each uplink occasion. This occasion means the time when according to a schedule resources for a data transmission from the user equipment are allocated. Such a data transmission does not require additional signalling for setting up the connection, or at least, should require far less than when the base station is not expecting it according to a schedule.

Should the user equipment miss the uplink occasion once or more than once, the base station would have by now terminated the transmission schedule. It is preferably a question of configuration as to how many of such missed uplink occasions should lead to a termination. From the base station's perspective, the number of missed uplinks should be preferably a quite low number in order not to allocate resources for a user equipment that is not operating anymore. In contrast, for a user equipment, this amount is preferably a quite high number in order to avoid setting up the dedicated prescheduled uplink transmission schedule again, which needs a lot of power. Moreover, for battery driven user equipment, this might be an issue and is preferably avoided. Here, in the battery driven arrangement, no good number is possible, as the requirements of both user equipment and base station contradict.

The following examples are presented in advance of the drawings, and which provide general motivation and justification of the embodiments described. In the exemplary case where one or more uplink occasion are missed by the user equipment, the base station does not receive an uplink transmission from the respective user equipment. Instead of cancelling immediately the presently active dedicated prescheduled uplink transmission schedule, the base station considers why the user equipment missed the uplink occasion(s).

This process is not necessarily initiated at the first missed occasion, which could be ignored by default, but rather, when two or more missed occasions occur. At this juncture, the base station checks if cancelling the dedicated prescheduled uplink transmission schedule is appropriate. For example, where the user equipment is capable of determining that the user equipment itself is to be considered as unavailable for communication in relation with the base station, at least at the uplink occasion, then the presently active dedicated prescheduled uplink transmission schedule is maintained.

This step of considering the situation, in view of the missed occasion, comprises a check about the situation of the user equipment. For instance, low-bandwidth devices, e.g. operating in half duplex, or with limited processing power, are unavailable for communication at said uplink occasion with the base station, in particular for making the data transmissions expected in course of the dedicated prescheduled uplink transmission schedule. That means, that although the user equipment might be operating in a communication session with the respective base station, it is to be considered as unavailable for communication at said uplink occasion with the base station, if such communication session is the reason for not making the data transmission at the uplink occasion.

This check takes into account that the base station might know about the reason for the missed uplink occasion. If this reason indicates, that the user equipment is in particular occupied (e.g., busy with other means), in particular initiated by the base station, then the missed uplink occasion is not considered for cancelling the presently active dedicated prescheduled uplink transmission schedule. This is advantageous as it brings in conformance, the needs of the base station to cope with that situation, as it can anticipate the missing of uplink occasions, and consequently react, whereas the user equipment needs to setup again the dedicated prescheduled uplink transmission schedule less often, than with the currently known procedure. Notably, the reasons the user equipment as being considered unavailable for communication with the base station might vary.

Determining if the user equipment is considered as unavailable for communicating at said uplink occasion with the base station, is based on determining at least one of the situations, namely that: the user equipment is in course of a data exchange session, the user equipment is operating in connection to another base station of the cellular network, and the user equipment was instructed to refrain from uplink communication as part of a radio policy. As noted above, this embodiment collects a couple of situations which for the base station are preferably considered to rate the user equipment as currently unavailable, at least at the uplink occasion. In case the user equipment is in course of a data exchange session, then it is—when being a limited-bandwidth user equipment—unable to carry out an uplink data transmission.

Such user equipment is often only capable of half-duplex communication; that is, it can either receive or transmit at a given time but not both simultaneously, in or operate in a limited frequency range only. Additionally or alternatively they may be limited in that they are capable only to support a limited number of processes; e.g., one or two HARQ processes only because they only have the corresponding number of HARQ chains, means respective storage for processing said receptions/transmissions. These "unavailable" type situation are known to the base station, because the data exchange session occurs through the base station. In particular, for the base station, the user equipment is additionally rated as being in course of a data exchange session, when the user equipment has transmitted data, and is waiting for a confirmation from the base station for the previous transmission. That means, that no real activity might be sufficient to rate the user equipment as unavailable, for example, it may be occupied at the time of the uplink occasion.

Briefly, a running software download to low-end devices camping on the base station is rated as a data exchange session. This might be part of MBMS or SCPTM (Single Cell Point To Multipoint) transmission.

Where the base station is involved in the data transmission, and it is aware of its involvement, it can consequently consider the affected user equipment as "unavailable" for communication, at least for uplink transmissions at the uplink occasion according to the dedicated prescheduled uplink transmission schedule. Additionally, or alternatively, a user equipment might be rated (or, can rate itself) as "unavailable" for communication with the (first and serving) base station, when it notices that the user equipment is operating in connection with another (second) base station of the cellular network. This is determined by communication between base stations, for example, through the cellular network, by an among the base stations or user equipment thereto coupled or connected. When the first base station is aware of this situation, then it is supposed not to expect an uplink transmission at the uplink occasion according to the presently active dedicated prescheduled uplink transmission schedule.

Alternatively the base station may consider the user equipment as unavailable for communicating with the base station when, or where, the user equipment was instructed to refrain from uplink communication, for instance, as part of a radio policy. Radio policy management (RPM) mechanisms are typically used to prevent the cellular network from and to solve overload situations, including, limiting the access for such user equipments. This is preferably the case for the situation of a radio policy management instruction which is foreseen to limit traffic, in particular caused through machine type communication, for example, communication via Internet of Things (IoT) devices. Such RPM messages are submitted by the base station to one or more camping user equipments, in response to a service request with a corresponding reject cause.

With such RPM messages, the user equipments are preferably instructed to refrain from accessing the cellular network; namely, carrying out data transmissions, at least under given preconditions.

Should that be the case, and additionally, the affected period also encompasses uplink occasions, though previously agreed and therefore allocated (hereinafter called hard RPM), then this embodiment suggests that the user equipment is not to blame for this situation. Hence the base station considers also in that situation the user equipment as unavailable for communicating with the base station, at least at the uplink occasion. Further the base station is aware of this situation, and consequently it is able to determine that the user equipment is not capable of carrying out the uplink transmission as part of the uplink occasion. Hence, when one or a combination of this situations is detected, this leads to the situation that the base station will not cancel the presently active dedicated prescheduled uplink transmission schedule upon detection of one or more missed uplink occasions. However, this situation might nonetheless not be maintained or maintainable.

Therefore, a further step of cancelling the presently active dedicated prescheduled uplink transmission schedule is provided in case a predetermined consecutive number of missed uplink occasions is detected where the user equipment is determined to be unavailable. This embodiment is applicable in such situations where the base station, for a long time, detects a user equipment as being considered "unavailable" for communication in relation with the base station during the uplink occasion. Preferably the predetermined number is rather high, in any case higher than the number of missed uplink occasions that are needed for cancelling the presently active dedicated prescheduled uplink transmission schedule, when the base station cannot consider the user equipment as unavailable for communicating with the base station.

Another method step includes allocating the resources allocated for the uplink occasion of presently active dedicate prescheduled uplink transmission schedule for another user equipment in case the user equipment is considered as being unavailable for communicating at said uplink occasion in relation with the base station. Here, the base station reallocates the resources originally reserved for the respective user equipment according to the presently active dedicated prescheduled uplink transmission schedule for other user equipments. It does this when the base station is aware of the situation that the respective user equipment will not be able to use the resources which would be reserved at a specific uplink occasion. That occurs when the base station initiated a downlink transmission to the user equipment, and is aware of the capability of the user equipment not to be able to make an uplink transmission during the downlink transmission session, then the base station can anticipate that the user equipment will not be able to use the imminent next occasions for an uplink transmission by the user equipment.

As previously noted, this anticipation will not lead to a cancellation of the presently active dedicated prescheduled uplink transmission schedule. Accordingly, the base station can use the resources that will not be used for uplink transmission for another user equipment that is requesting uplink resources at that time. For a congested traffic situation, this is advantageous since no resources are wasted. Further, this reduces the negative impact of a user equipment which is unable to use the uplink transmission occasion offered by the base station, as long it is anticipated by the base station. For the base station, an optimal usage of resources is important. That is achieved with this embodiment, hence for the base station it is no issue to continue the presently active dedicated prescheduled uplink transmission schedule, even though the user equipment missed one or more uplink occasions.

According to another embodiment, the base station is configured to provide at least one instruction to refrain from uplink communication as part of a radio policy to the user equipment. The instruction establishes a limit to communication attempts with the base station; namely to within a predetermined time, and to a certain number of attempts. The base station is configurable to omit data transmissions of the user equipment at the uplink occasion according to the dedicated prescheduled uplink transmission schedule for counting against said certain number of attempts. This embodiment relates to another variant of RPM instructions. The instructions, which follow a radio policy sent by the base station to the user equipment, provide an indication, that it is only allowed to carry out a defined number of accesses during the validity of the RPM instructions, for example, during a predetermined time.

This instruction, and accompanying indication, allows for a user equipment to manage its data transmissions and allow—e.g. in emergency situations—itcontact to a remote server. However, for regular data transmissions, in terms of measurements or other metrics, this amount might be too low. Hence, the user equipment will then not be able to make its regular data transmissions. However, as the base station is aware of the active dedicated prescheduled uplink transmission schedule of the user equipment, it softens the RPM instructions in a literal sense; namely, that data transmissions at the uplink occasions according to the dedicated prescheduled uplink transmission schedule are not counted against the predetermined number.

Alternatively no such number is defined, but data transmissions are allowed for the user equipment only at uplink occasions according to the dedicates prescheduled uplink transmission schedule, while any other data transmission in between is prohibited. This means that the base station has considered the occasions and accounted for them in its overload evaluation. For instance, it has still the required resources, and is configurable to block further communication attempts but not the transmission in conjunction with prescheduled uplink occasions themselves.

This method of operating, or configuring, a base station is a kind of soft RPM, as it allows for the user equipment operating in a dedicated prescheduled uplink transmission schedule to operate as before. Only data transmission outside of this schedule are blocked (e.g., limited). This is advantageous, because the base station expects data transmissions of the camping user equipments as long as they are part of the dedicated prescheduled uplink transmission schedule. Other data transmissions shall be limited, preferably not fully prohibited. This embodiment fulfills the requirement of both the user equipment's and the base station's cellular network needs.

According to another embodiment the instruction (to refrain from uplink communication as part of a radio policy) is provided in response to the reception of a data transmission from the user equipment; that data transmission performed in conjunction with the uplink occasion of the dedicated prescheduled uplink transmission schedule. This embodiment provides that the instructions—according to radio policy, in particular RPM instructions—are different to the known approach; not (only) transmitted as part of a rejection message, but as part of a confirmation message, for confirming receipt of the data transmission as part of an uplink occasion.

As with this soft RPM approach, the communication (according to the dedicated prescheduled uplink transmission schedule) is allowable. It is therefore advantageous to instruct the respective user equipment over this way. This is to ensure the user equipment is not surprised by a rejection for a data transmission that was possible before the radio policy was raised. Data transmissions (according to the dedicated prescheduled uplink transmission schedule) are allowed as part of this soft RPM approach to provide the best channel to communicate changes of the radio policy.

According to the second embodiment, the base station of the cellular network is configured to serve at least one user equipment camping on the base station. The base station is configured to agree with the user equipment on a periodic dedicated prescheduled uplink transmission schedule. The base station is configured, in case one or more uplink occasion of the dedicated prescheduled uplink transmission schedule is missed by the user equipment, to determine if the user equipment is considered as unavailable for communicating at the uplink occasion in relation with the base station. And, if so, it will maintain a presently active dedicated prescheduled uplink transmission schedule Otherwise, it will cancel the (presently active) dedicated prescheduled uplink transmission schedule.

The base station is communicatively connected to other components of the cellular network. Coupling of user equipment in the network can be achieved via a wired connection link. The base station comprises transmitting and receiving circuitry and an antenna for communication with a plurality of user equipments in the cell area populated by the base station. The base station further comprises processing circuitry for executing operating software, and in particular software implementing computer instructions for carrying out the method according aspects of the invention. Further the base station comprises volatile and permanent memory for storing software, configuration data and caching data. Components therein are capable of storing and retrieving data relating to (camping) user equipments, and in certain arrangements, are stored at least volatile.

In a third embodiment, a method for operating a user equipment with a base station of a cellular network is provided. It comprises the steps for the user equipment of agreeing with the base station on a periodic dedicated prescheduled uplink transmission schedule, carrying out at least one uplink transmission at at least one uplink occasion according to said dedicated prescheduled uplink transmission schedule, and refraining from carrying out an uplink transmission in case the user equipment being unavailable for communicating at this uplink occasion with the base station.

This embodiment relates to the operation of the user equipment in the situation described in the previous embodiment. According to that embodiment, the user equipment is camping on a base station, the so-called serving base station. That is possible when it is situated, stationary, in the cell area of the base station, or is sufficiently close to the base station for being able to receive signals of the base station and to transmit signals to the base station that are well received at the base station. A "stationary" user equipment is one that is expected, at least for a remarkable period of time, not or not materially move from its place. This is the case in particular for fixed installed devices, like metering devices. But this can also apply to user equipment, for example, installed in a parking car. The special situation for stationary user equipments is, that in the normal procedure it would not leave the cell area of the currently serving base station.

The user equipment is further capable of agreeing with the base station on a periodic dedicated prescheduled uplink transmission schedule. This applies to stationary metering device or other devices that are frequently, periodically transmitting data in a similar manner (e.g., amount of data). Preferably the base station has already been providing an indication to the user equipment of the devices that it supports according to the dedicated prescheduled uplink transmission schedules. This is preferably done via a broadcast, e.g. of system information, or as part of the registration or during a dedicated connection.

As part of the agreeing procedure, the user equipment sends a request for setting up such a dedicated prescheduled uplink transmission schedule to the serving base station. That request includes a requested periodicity and an amount of data to be transmitted on each occasion for transmitting data, hereinafter uplink occasion. It is advantageous when this request is part of data transmission session, and is common to following data transmissions according to the dedicated prescheduled uplink transmission schedule.

When the base station accepts (confirms in response) the request for setting up the dedicated prescheduled uplink transmission schedule, then the schedule is operative. Consequently the user equipment will (according to the periodicity agreed upon) send uplink data transmissions on each uplink occasion in the size as agreed. When no data transmission is possible for a few occasions, the user equipment would prefer that it does not have to set up the dedicated prescheduled uplink transmission schedule again, in particular for a congested base station which might even refuse due to the high traffic a new uplink transmission schedule. Consequently when the user equipment is not capable of communicating with the base station at this uplink occasions, and, in particular, knows that this situation is known to the serving base station, then it will refrain from carrying out such uplink transmission. The consequence of ending the dedicated prescheduled uplink transmission schedule would, under this condition, not happen. In this case, as the dedicated prescheduled uplink transmission schedule is not cancelled, despite missing this uplink occasion due to unavailability of the user equipment, the user equipment will use the next uplink occasion to carry out data transmission, at least as long as it is not still or again unavailable at the time of the next uplink occasion. This is advantageous as a temporary unavailability will not end the dedicated prescheduled uplink transmission schedule, and both user equipment and base station are aware of it.

In a preferred embodiment of the method for operating a user equipment, in the case of receiving a radio policy instruction from the base station including instructions to refrain from uplink communication, the method further comprises the steps of carrying out uplink transmissions only at uplink occasions according to said dedicated prescheduled uplink transmission schedule in response. This embodiment relates to instructions from the base station to refrain from uplink communication. This relates to base station that support means to prevent from overload situations, e.g., blocking or rejecting momentary traffic requests and indicating a time when the next attempt is expected. Such methods are known under the terms RPM or network friendly behavior. In such cases, a user equipment is not allowed to do more connection attempts in a certain time or they are in generally blocked for a certain time. Embodiments herein mitigate the relation of these overload mechanisms and related pre-scheduled transmissions.

In accordance with this embodiment, the user equipment, when operating in a dedicated prescheduled uplink transmission schedule, may ignore the instructions as part of the RPM, and consequently continue sending data transmission at the time of the uplink occasion. This is possible because the base station has agreed on allocating the resources at that agreed periodicity. Hence, for making a decision to send RPM instructions, user equipments, in particular MTC devices, shall refrain from setting up data exchange sessions, where the already allocated resources could be taken into account.

Preferably the base station indicates with its RPM instructions that this consideration of pre-allocated resources (according to the dedicated prescheduled uplink transmission schedule) has been carried out for user equipment camping on the base station. Consequently a user equipment, which is operating in an active dedicated prescheduled uplink transmission schedule, will carry out its data transmissions at the uplink occasions, despite receiving the RPM instruction. However, at other times (e.g., for other purposes outside of the uplink occasion) no data transmission may be carried out for the same user equipments.

Hence this embodiment provides situational exceptions from the general RPM instructions, but not individual exceptions. That means, no originally affected user equipment is fully free to make data transmissions in contrast to the RPM instructions, only because a dedicated prescheduled uplink transmission schedule is active. This RPM related behavior is called soft RPM hereinafter. It differs from other RPM schemes, where a coordination of the RPM related effects with the aims of a dedicated prescheduled uplink transmission schedule is carried out under different premises.

According to this embodiment in the case of reception of a radio policy instruction, the step of carrying out uplink transmission comprises transmission of information of different origin and/or content than the previously submitted data transmission as part of the uplink occasion according to said dedicated prescheduled uplink transmission schedule. With this aspect of the embodiment the user equipment is put into the position to react on the communication limitation as part of the radio policy instruction. Typically for higher priority (e.g., important) information to be transmitted—provided the allowed amount of data is sufficient—the user equipment may use the uplink occasion for transmitting other data. Such data is typically of other origin, for instance, there is no measurement data, but instead status data.

Such higher priority information does not always refer to, or relate to, emergency calls, which are usually allowed, for example, information to overrule the RPM instructions. Such status data may provide information to the remote server that a radio policy instruction is active. This might lead to a decision to avoid a software update or other request from the remote server side. Also a status update might relate to the situation of the user equipment, for example, the status or activity of an attached application. As an example, in a connected car situation, a detection of mileage, oil level etc., would trigger a request to schedule a visit to the garage. In this example situation, such a data transmission of a device status or activity may even be addressed to another communication endpoint instead of the regular data transmissions of a periodic data transmission.

According to another aspect, in the case of reception instructions to limit communication attempts with the base station within a predetermined time to a certain number of attempts, the method comprises the steps of omitting the occurring uplink occasions in that time for counting against that certain number. This aspect of the embodiment relates to another variant, wherein the RPM instructions comprises an indication for the addressed user equipment, that it is only allowed to carry out a defined number of accesses during the validity of the RPM instructions (e.g., during a predetermined time). According to this embodiment however, in case of an active dedicated prescheduled uplink transmission schedule, this issues is resolved.

As a further variant of the soft RPM scheme for such a situation, that data transmissions at uplink occasions according to the active dedicated prescheduled uplink transmission schedule are not accounted against the allowed number of data transmissions. This leads to the advantageous effect, that also for such RPM schemes user equipments with a running dedicated prescheduled uplink transmission schedule are not limited in its data transmission activity, and the base station can foresee this.

According to another preferred embodiment, in the case instructions from the first base station are received to limit communication attempts with the base station, the method further includes carrying out uplink transmissions with a second base station than the first base station, and returning to the first base station afterwards. This aspect of the embodiment relates to a "hard RPM", as opposed to the soft RPM mentioned before. That means that even user equipments that are currently operating in a dedicated prescheduled uplink transmission schedule would be blocked from transmitting data.

As set out before, a base station would consequently not cancel the dedicated prescheduled uplink transmission schedule due to the missing of an uplink occasion through the user equipment as this is following the RPM instruction. However, in case the user equipment has a need of carrying out its data transmission, in particular, after a couple of uplink occasions have passed, then the user equipment tries to register on another base station and carry out its data transmission there. Should no such base station be available, or such base stations are blocked, this will fail, but at least the user equipment shall be able to try. After this failed attempt the user equipment returns to the first user equipment, where the dedicated prescheduled uplink transmission schedule is still active. Preferably, once the hard RPM instruction not to carry out data transmissions has ended, the dedicated prescheduled uplink transmission schedule continues without any additional signalling needs. It continues as if nothing has happened.

This embodiment is advantageous as it allows the user equipment to carry out data transmissions when it is temporary blocked from the serving base station. However, that does not mean that the dedicated prescheduled uplink transmission schedule needs to be cancelled. In particular in dense traffic agreeing upon a new dedicated prescheduled uplink transmission schedule could possibly not be successful. Additionally after a hard RPM—which might be necessary from the base station perspective at certain situations—it is with this embodiment prevented, that afterwards a run for setting up dedicated prescheduled uplink transmission schedules is happening which in the end increases the signalling load again, just for setting up the schedules, that were already defined prior to the hard RPM. With this embodiment the operation continues undisturbed after the hard RPM. This makes the decision for the base station easier to launch a hard RPM, as no such counter effects are to be expected.

According to a fourth embodiment a user equipment is configured to be operated on a base station of a cellular network. Briefly, the user equipment can be configured to implement the method exemplified in the third embodiment. The user equipment is configured to agree with the base station on a periodic dedicated prescheduled uplink transmission schedule, and to carry out at least one uplink transmission at at least one uplink occasion according to the dedicated prescheduled uplink transmission schedule. It is configured to refrain from carrying out the uplink transmission in case the user equipment is unavailable for communicating in the uplink occasion with the base station. This embodiment relates to a user equipment capable of operating with a base station according to the second aspect of a cellular network. The user equipment provides a couple of components for conducting wireless communication. This comprises at least processing circuitry for executing operation software, in particular those implementing the method of the first aspect of the invention. Preferably the user equipment is capable of operating with a base station supporting the standards of 3G, 4G, 5G or beyond, including variants, like Nb-IoT, CAT-M, Cat-1 etc., which also includes user equipments that are momentary operating in NB-IoT or Cat-M mode for power saving reasons in low activity phases, although being possible to operate in higher categories.

The user equipment further comprises transmitting and receiving circuitry in connection with at least one antenna, typically a transceiver for exchanging wireless communication signals with the base station of the cellular network. If further includes a memory unit for volatiles and/or permanent storage of executable software, configuration data and measured data. The user equipment is configurable for transmitting the data as part of a neighbor measurement report. The user equipment is configured to camp on a serving base station, and to carry out data transmissions by means of the transmitting and receiving circuitry.

The user equipment provides an application part having processing circuitry for collecting measurement data, either measured by a sensor of the application, or a remote sensor communicatively coupled to the application. Such communicatively coupled components may employ the transmitting and receiving circuitry of the user equipment, or alternatively other communication circuitry, for example, including wired or wireless connections, to be used (e.g. a Bluetooth, Wimax, or Wifi connection).

The embodiments disclosed above advantageously provide a solution to enhance agreement on a dedicated prescheduled uplink transmission schedule between a base station and a user equipment. This mitigates congestion for the base station and improves power management of the user equipment.

FIG. 1 schematically shows a user equipment 10 in a spatial relationship with a respective base station 4, according to one embodiment. The user equipment 10 is stationary and a machine-type communication device. It is preferably configured to regularly transmit a certain amount of data to a remote server, for example, as an electricity metering device, a vending machine or other device for monitoring a defined situation with sensors.

The base station 4 is one of a plurality of base stations comprising cellular network 1. This base station 4 is the direct counterpart to the user equipments 10 on the air interface 2. Such a base station is utilized for cellular networks supporting the LTE technology standard an eNodeB, as example. Compared to previous technology standards eNodeBs cover more functionality and flexibility in terms of scheduling of resources for the assigned user equipment 10. The base station 4 supplies a geographical area of cell 5 to provide connectivity for user equipments situated in this geographical area. This allows for a user equipment 10 located in the cell are 5 to associate with base station 4; that is, to camp on the base station 4.

The user equipment 10 according to this exemplifying embodiment comprises an antenna 11 which serves as a connection point to the air interface 2. It further comprises an identification module 3, in particular, for example, a SIM card, an UICC, or a soldered identification module, or a piece of software contained in one of the other components in a secure manner, which holds the authentication credentials with which the user equipment 10 registers at the cellular network 1, in particular, for example, the base station 4. This identification modules resp. its stored data allows the cellular network 1 to determine if the user equipment 10 is entitled to be served within the cellular network 1, and in particular, if it is a prepaid or a contract subscription with proven credibility. Additionally the user equipment 10 comprises steps of receiving and transmitting circuitry, processing circuitry and volatile and/or permanent memory (all not shown).

Figure 2A:
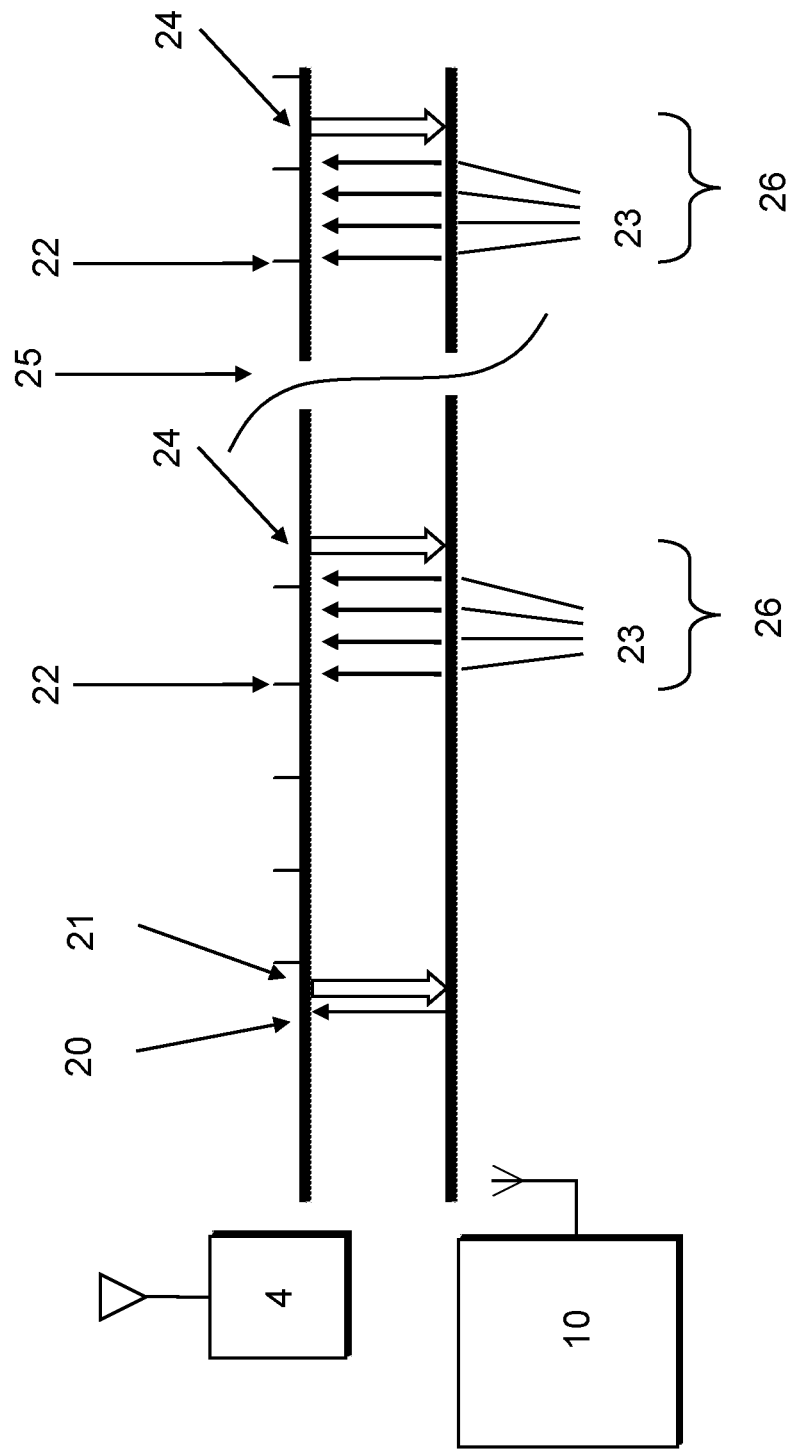
FIG. 2A illustrates a timeline of a base station and a user equipment operating in dedicated uplink resource transmission schedule in accordance with one embodiment.

FIG. 2A illustrates a timeline of a base station and a user equipment operating in dedicated uplink resource transmission schedule in accordance with one embodiment. It shows schematically the situation; namely, how a user equipment 10, which is configured to transmit data in a periodicity related transmission mode, and the base station 4 it is camping on, are exchanging data in order to fulfil a regular sending task. Shown in FIG. 2A are visible time bars for the user equipment 10 and the base station 4. Arrows indicate a data transmission from one party to the other. The user equipment 10 is typically equipped with a clock (e.g., a timer) which figures out, when a data transmission is due. In a preferred embodiment the user equipment 10 receives information about the schedule from a remote server (not shown). The remote server thus tries to avoid peaks where all supported user equipments, even in different cells, are providing their data.

With data transmission 20 the user equipment sends a request to the base station to set up a dedicated prescheduled uplink transmission schedule. This request comprises at least an indication relating to the preferred periodicity and the amount of data to be transmitted per uplink occasion.

The base station 4 evaluates the request, and in case of sufficient resources for fulfilling the request, confirms setting up a dedicated prescheduled uplink transmission schedule, by means of sending a response message 21, which includes the details of periodicity and allocated resources for data transmission at the respective uplink occasion 26.

After reception of the response 21, both the user equipment 10 and the base station 4 activate the dedicated prescheduled uplink transmission schedule instead of normal scheduled communication. Preferably the user equipment conducts further steps, in particular, it switches off mobility related measures. That means it assumes that it is a stationary user equipment and it successfully camped on a base station 4; that is, no cell-reselection is necessary for the time being. Consequently the user equipment 10 and the base station 4 each set a timer according to the periodicity, in particular, for example, an offset in seconds or frames to the last communication. When the timer expires at the respective system frame number 22 the base station 4 allocates the respective resources for receiving the data transmission expected from the user equipment. This means now the data transmission window of the user equipment is open, which is here called uplink occasion 26.

With the data transmissions 23, user equipment 10 now submits without further signalling exchange in advance between the user equipment and the base station 4 the data which are preferably dedicated for a remote server, e.g. the metering collection server, in the amount as allowed with the response message 21. Here a method without further in advance signalling is provided but also a solution with reduced signalling exchange would be possible. Preferably the base station 4 acknowledges with acknowledge message 24 safe receipt of the transmitted data from the user equipment 10. Here this is displayed with one message 24 after the complete data transmissions 23, but an acknowledgement message per data transmission message 23 is as alternative solution also part of this embodiment.

Once the data transmission has concluded the timer is reset and the same operation is started after the same amount of system frames or a defined time. The next data transmission comprises the same message flow as the previously described. It is a matter of agreement between the user equipment and the base station 4, if the next timer is started at the end of the transmission, that is with message 24, or directly after expiry of the previous timer, that is at system frame number 22.

Figure 2B:
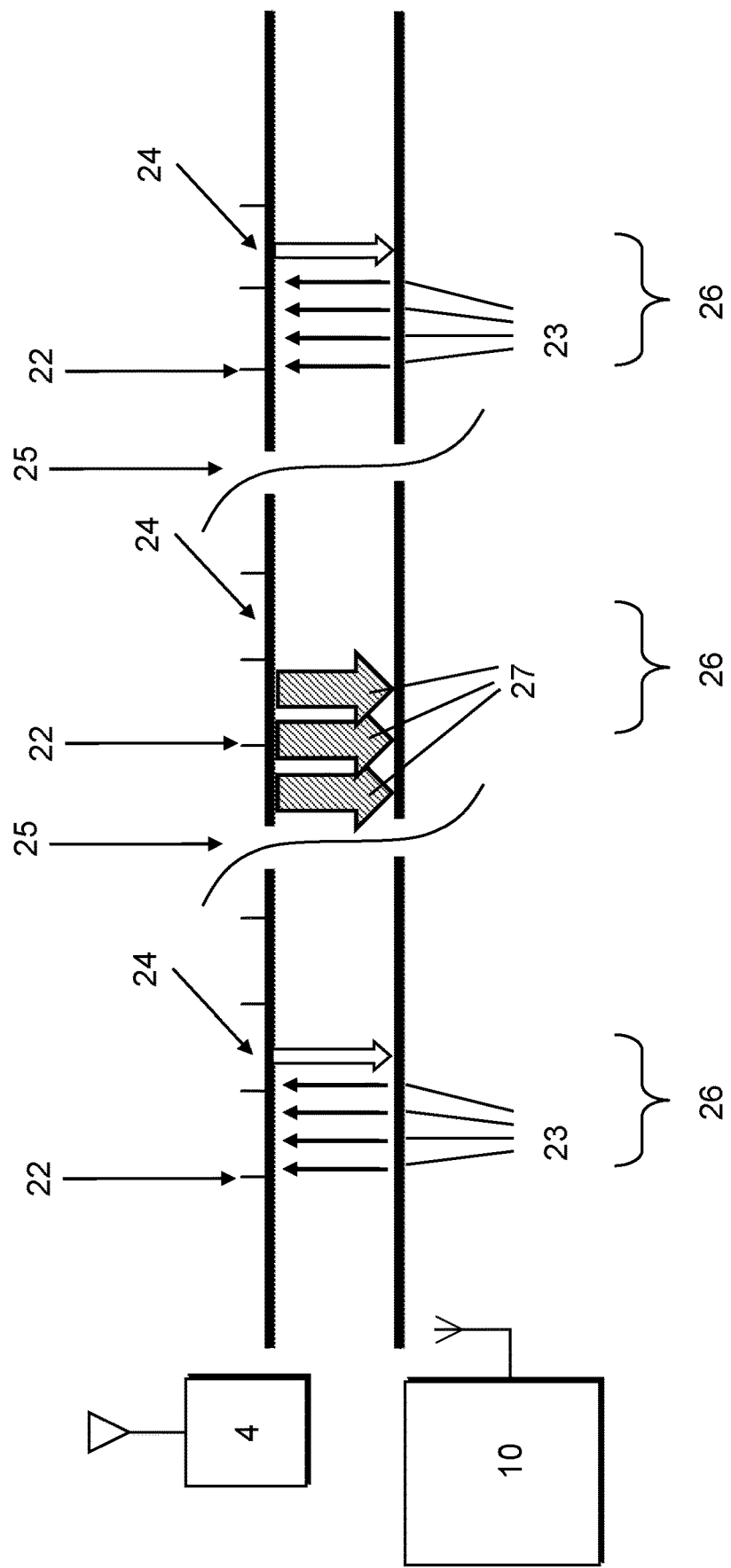
FIG. 2B illustrates a timeline of a base station and a user equipment operating in dedicated uplink resource transmission schedule incurring an unrelated data transmission in accordance with another embodiment.

FIG. 2B illustrates a timeline of a base station and a user equipment operating in dedicated uplink resource transmission schedule incurring an unrelated data transmission in accordance with another embodiment. Briefly, the dedicated prescheduled uplink transmission schedule originally started in FIG. 2A is continued with another uplink occasion 26, where at time frame 22 further data transmissions 23 are carried out.

After a couple of such transmissions (indicated by blanked part 25) the user equipment is occupied with a data transmission session 27 unrelated to the dedicated prescheduled uplink transmission schedule. Instead in this example a larger download of data is carried out. This might be a software download or the like. In particular for low-capability devices, e.g. operating in low categories of the technology standard, like NB-IoT, Cat-M, Cat-1, and/or in a mode like enhanced coverage such data transmission may take a while.

As shown here, the data transmission session 27 overlaps with the uplink occasion window 26. Consequently the user equipment 10, in particular when not capable of carrying out additional data transmission sessions in parallel to a download, would miss the upload occasion 26, which means no data transmission 23 as agreed in the dedicated prescheduled uplink transmission schedule is carried out. Normally this would, after a predefined number of missed uplink occasions, lead to the situation that the base station 4 cancels the dedicated prescheduled uplink transmission schedule. This is due to the fact that the user equipment 10 might be switched off, deactivated, out of power or moved to another cell. This situation would not be known to the base station 4.

However the data transmission 27 is known to the base station 4. Hence the data transmissions 27 can be considered as reason for missing the uplink occasion 26. Consequently the base station 4 does not cancel the dedicated prescheduled uplink transmission schedule, but instead allocates for the next uplink occasion at next frame 22 the respective resources for receiving data transmissions 23 again. At the next uplink occasion 26 the user equipment is not occupied anymore with a data transmission session 27 and consequently makes its data transmissions 23 again. The dedicated prescheduled uplink transmission schedule is therefore supposed to continue.

Figure 3:
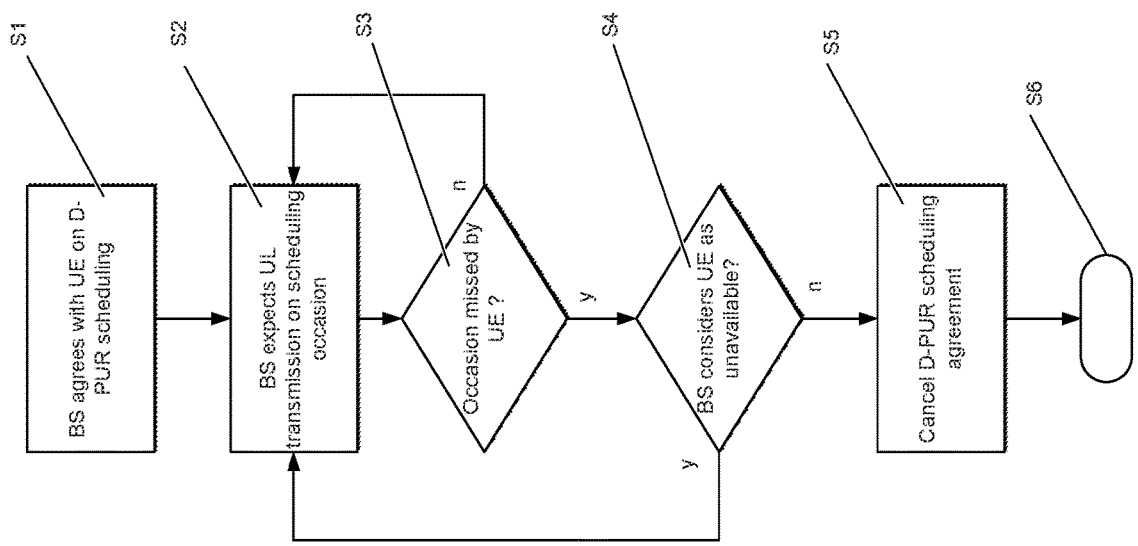
FIG. 3 illustrates a flow diagram describing a preferred embodiment of the invention.

In FIG. 3 a flow chart shows a procedure according to an exemplifying embodiment of the invention from the perspective of the base station according to the first aspect of the invention.

The workflow starts with step S1, where user equipment 10 and base station 4 agree on a dedicated prescheduled uplink transmission schedule, in this case, the implementation known as D-PUR. Such agreement typically requires a request from the user equipment, indicating at least envisaged periodicity and the amount of data. The base station 4 then responds and provides data indicating which periodicity and allocated data per uplink occasion would be possible. The user equipment accepts this response or cancels the dedicated prescheduled uplink transmission schedule, when not sufficient.

When the response is accepted, either through another message to the base station 4 or by just following the agreed schedule, then the base station 4 sets an internal timer. At expiry of the timer at step S2 the base station 4 expects an uplink transmission at the uplink occasion according to the dedicated prescheduled uplink transmission schedule. It is then checked in decision step S3 if the base station received a data transmission according to the dedicated prescheduled uplink transmission schedule. If this is the case the flow branches again to step S2, where in the same periodicity the next uplink transmission is expected. As the periodicity might be in the range of hours or days, this might take some time, and is therefore preferably exception based (e.g, interrupt triggered), instead of implementing a waiting loop.

Should in step S3 the base station 4 detect that no data transmission was received during the uplink occasion, then the flow branches to step S4, where another check is carried out. Here it is checked if the base station 4 considers the user equipment as unavailable, which means it is occupied at the uplink occasion. Then, it is checked if the base station 4 is aware of any reasons why the user equipment might not be able to make a data transmission. As shown in the example before, this might be due to unplanned massive data transmissions session. Or, it might further be due to a blocked transmission from a radio policy instruction by the base station 4 itself.

If this is the case, the flow branches back to step S2. There at the next uplink occasion a normal data transmission according to the dedicated prescheduled uplink transmission schedule might happen. Preferably, when the base station 4 already is aware of the fact that the user equipment is considered to be unavailable at the next uplink occasion, it would in step S2 refrain from allocating resources for the next uplink occasion, instead such resources could be assigned to another user equipment, should it request resources at that time.

Otherwise the flow branches to step S5 where the base station 4 decides to cancel the dedicated prescheduled uplink transmission schedule (e.g., D-PUR agreement). This might in another embodiment be the case not before a predetermined number of—in particular successive—missed uplink occasions, where no unavailability of the user equipment is known to the base station 4, has occurred.

At step S6, this ends the procedure flow.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

What is claimed is:

1. A method for operating a base station of a cellular network, the method comprising:
serving user equipment camping on said base station;
agreeing with the user equipment on a periodic dedicated prescheduled uplink transmission schedule;
determining when an uplink occasion of the dedicated prescheduled uplink transmission schedule is missed by the user equipment; and, if so:
determining if the user equipment is considered as unavailable for communicating at said uplink occasion in relation with the base station, and if so,
maintaining a presently active dedicated prescheduled uplink transmission schedule, otherwise,
cancelling the presently active dedicated prescheduled uplink transmission schedule, and
wherein the method further comprises the steps of:
determining if the user equipment is unavailable;
detecting a predetermined consecutive number of missed uplink occasions where the user equipment is determined to be unavailable; and, if so,
cancelling the presently active dedicated prescheduled uplink transmission schedule.

2. The method according to claim 1, wherein said step for determining if the user equipment is considered as unavailable for communicating at said uplink occasion with the base station, further includes determining at least one of a situation, that:
the user equipment is in course of a data exchange session;
the user equipment is operating in connection to another base station of the cellular network; and,
the user equipment was instructed to refrain from uplink communication as part of a radio policy.

3. The method according to claim 1, further comprising the step of allocating resources allocated for the uplink occasion of the presently active dedicated prescheduled uplink transmission schedule for another user equipment when the user equipment is considered as unavailable for communicating at said uplink occasion in relation with the base station.

4. The method according to claim 3, wherein the base station is configured to provide an instruction to refrain from uplink communication as part of a radio policy to the user equipment, wherein the instruction comprises a limitation of communication attempts with the base station within a predetermined time to a certain number of attempts, further comprising omitting data transmissions of the user equipment at the uplink occasion according to the dedicated prescheduled uplink transmission schedule for counting against said certain number of attempts.

5. The method according to claim 4,
wherein said instruction to refrain from uplink communication as part of a radio policy is provided in response to the reception of a data transmission from the user equipment in conjunction with the uplink occasion of the dedicated prescheduled uplink transmission schedule.

6. A base station of a cellular network, configured to:
serve at least one user equipment camping on said base station;
agree with the user equipment on a periodic dedicated prescheduled uplink transmission schedule;
determine when one or more uplink occasion of the dedicated prescheduled uplink transmission schedule is missed by the user equipment; and if so: determine if the user equipment is considered as unavailable for communicating at said uplink occasion in relation with the base station; and,
if so, maintain a presently active dedicated prescheduled uplink transmission schedule, and
otherwise, cancel presently active dedicated prescheduled uplink transmission schedule, wherein the base station is further configured to:
determine if the user equipment is unavailable;
detect a predetermined consecutive number of missed uplink occasions where the user equipment is determined to be unavailable; and, if so,
cancel the presently active dedicated prescheduled uplink transmission schedule.

7. The base station according to claim 6,
wherein for determining if the user equipment is considered as unavailable for communicating at said uplink occasion with the base station, the base station is configured to determine at least one of the situations, that:
the user equipment is in course of a data exchange session;
the user equipment is operating in connection to another base station of the cellular network; and the user equipment is instructed to refrain from uplink communication as part of a radio policy.

8. The base station according to claim 6,
wherein the base station is further configured to allocate resources allocated for the uplink occasion of presently active dedicate prescheduled uplink transmission schedule for another user equipment when it has considered the user equipment as unavailable for communicating with the base station during said uplink occasion.

9. A method for operating a user equipment with a base station of a cellular network, comprising the steps for the user equipment of:
agreeing with the base station on a periodic dedicated prescheduled uplink transmission schedule;
carrying out at least one uplink transmission at at least one uplink occasion according to said dedicated prescheduled uplink transmission schedule; and,
refraining from carrying out an uplink transmission where the user equipment is unavailable for communicating at said uplink occasion with the base station, and
where upon reception of instructions to limit communication attempts with the base station within a predetermined time to a certain number of attempts, the method further comprises the step of omitting occurring uplink occasions in said predetermined time for counting against said certain number of attempts.

10. The method according to claim 9,
where upon receiving a radio policy instruction from the base station comprising instructions to refrain from uplink communication, the method further comprises the step of:
carrying out uplink transmissions only at uplink occasions according to said dedicated prescheduled uplink transmission schedule in response.

11. The method according to claim 10,
where upon reception of said radio policy instruction, the step of carrying out uplink transmission comprises transmitting information of different origin and content than a previously submitted data transmission as part of the uplink occasion according to said dedicated prescheduled uplink transmission schedule.

12. The method according to claim 3,
where upon reception of said instructions from said base station to limit communication attempts with the base station,
carrying out uplink transmissions with a second base station instead of said base station; and,
returning to said base station afterwards.

13. A user equipment configured to be operated on a base station of a cellular network,
wherein the user equipment is configured to agree with the base station on a periodic dedicated prescheduled uplink transmission schedule, and to carry out at least one uplink transmission at at least one uplink occasion according to said dedicated prescheduled uplink transmission schedule,
and, to refrain from carrying out said uplink transmission where upon the user equipment is unavailable for communicating at the uplink occasion with the base station, and
wherein the user equipment is further configured to, upon reception of instructions to limit communication attempts with the base station within a predetermined time to a certain number of attempts, omit occurring uplink occasions in said predetermined time for counting against said certain number of attempts.

14. The user equipment according to claim 13, further configured for receiving radio policy instructions from the base station comprising instructions to refrain from uplink communication, and carrying out uplink transmissions at uplink occasions according to said dedicated prescheduled uplink transmission schedule in response.

* * * * *